Oct. 10, 1950   C. E. ANDERSON ET AL   2,525,194
CONNECTING LINK
Filed Aug. 17, 1946   2 Sheets-Sheet 1

INVENTORS
Carlos E. Anderson
Charles E. Sennholtz
By Carlson, Pitzner, Hubbard & Wolfe
ATTORNEYS Oct. 10, 1950    C. E. ANDERSON ET AL    2,525,194
CONNECTING LINK
Filed Aug. 17, 1946    2 Sheets-Sheet 2
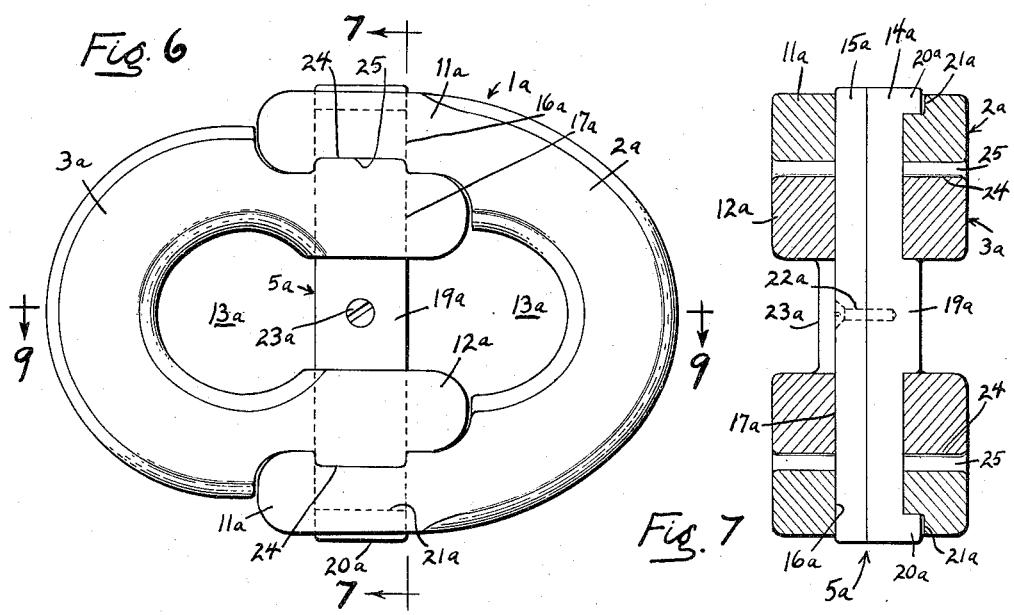
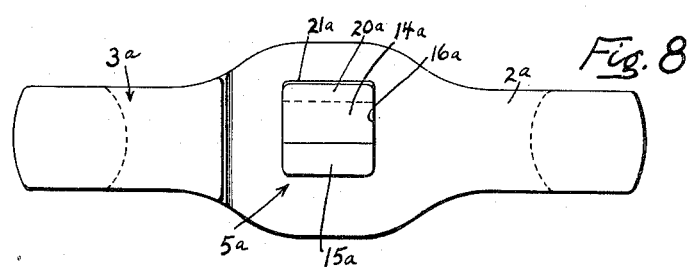
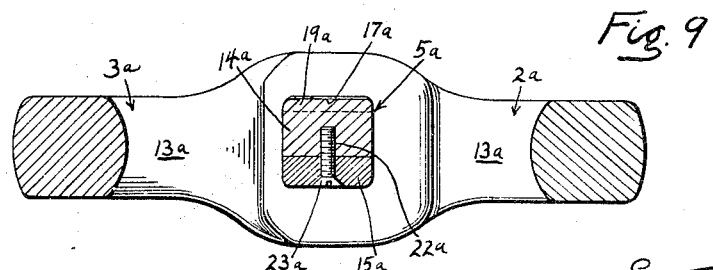
INVENTORS
Carlos E. Anderson
Charles E. Sennholtz
ATTORNEYS Patented Oct. 10, 1950

2,525,194

UNITED STATES PATENT OFFICE 2,525,194

CONNECTING LINK

Carlos E. Anderson and Charles E. Sennholtz, Chicago, Ill.

Application August 17, 1946, Serial No. 691,209

7 Claims. (Cl. 59—86)

The present invention relates to a connecting link and has particular reference to a link with separable end sections for repairing link chains, such, for example, as heavy duty chains commonly employed for ship anchors and drag line excavator buckets.

One of the objects of the present invention is to provide a novel connecting link which is constrained against lateral contraction or spreading.

Another object is to provide a new and improved connecting link having locking means for joining the opposite link ends, which locking means is simple, inexpensive, and sturdy in construction, and capable of ready assembly and disassembly.

Other objects and advantages will become apparent as the description proceeds.

In the accompanying drawings:

Fig. 6 is a face view of a modified form of connecting link embodying the invention;

Fig. 7 is a transverse sectional view taken substantially along line 7—7 of Fig. 6;

Fig. 8 is a side edge view of the link illustrated in Fig. 6;

Fig. 9 is a longitudinal sectional view taken substantially along line 9—9 of Fig. 6.

Figure 1:
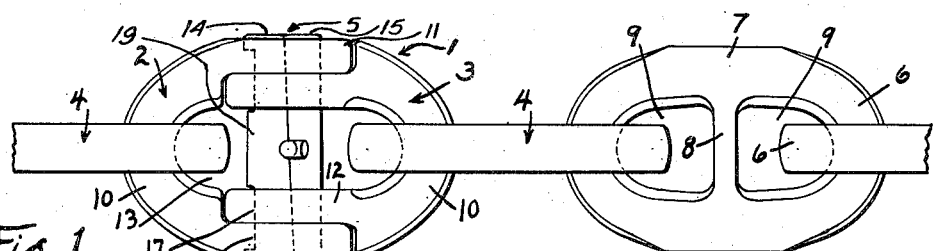
Fig. 1 is a fragmentary view of a portion of a chain including a connecting link embodying the features of the present invention.
Figure 2:
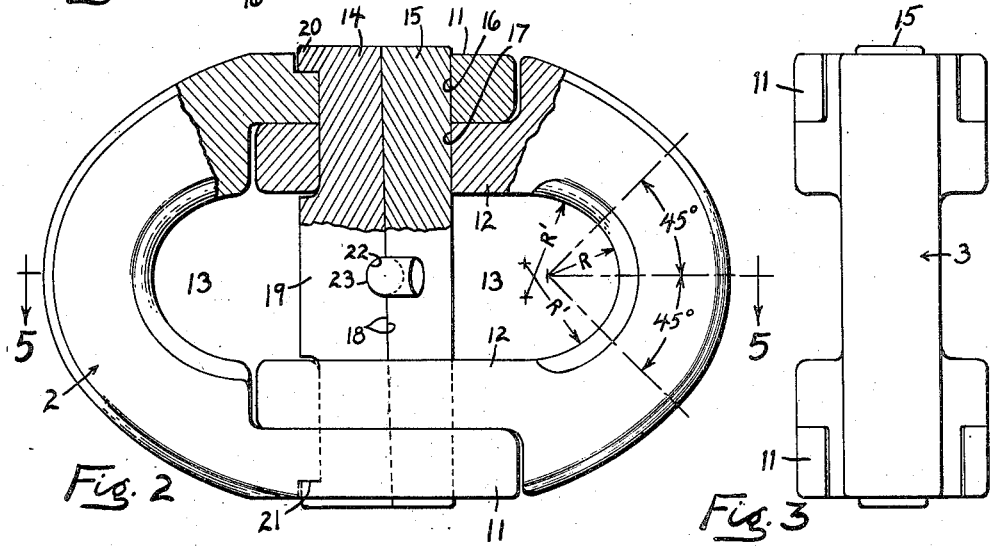
Fig. 2 is a face view of the connecting link on an enlarged scale, and with one side portion thereof in section through the locking means.
Figure 3:
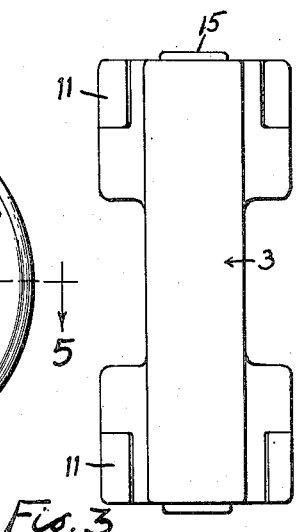
Fig. 3 is an end elevational view of the link.
Figure 4:
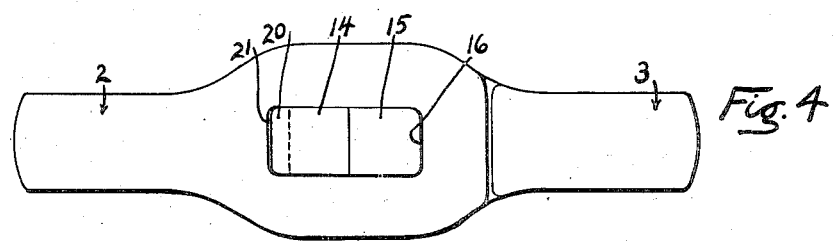
Fig. 4 is a side edge elevational view of the link.
Figure 5:
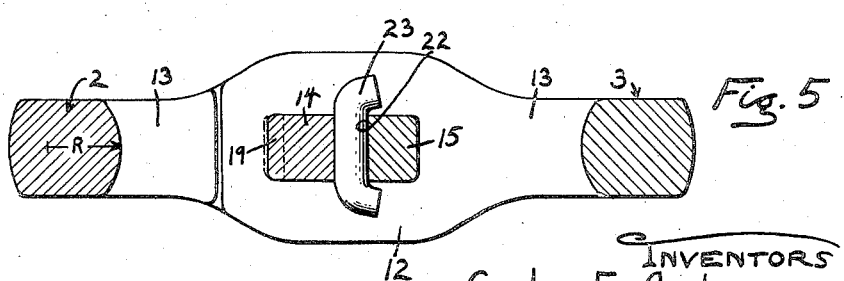
Fig. 5 is a longitudinal sectional view taken substantially along line 5—5 of Fig. 2.

Referring more particularly to the drawings, the connecting link 1 constituting the exemplary embodiment of the invention comprises two principal U-shaped end sections or half links 2 and 3 which are adapted to be separated for insertion through the adjacent terminal links 4 of two chain segments, and then secured together by a disengageable locking means 5 to join the chain segments into a single length chain, as fragmentarily illustrated in Fig. 1. For heavy duty chains, the conventional links 4 are usually oblong or oval in shape and cast as integral structures, with their curved ends 6 in interconnected relationship. While the connecting link 1 of the present invention may be used to join chain links of various types and forms, the links 4 herein shown are of the specific construction disclosed in our copending application, Serial No. 666,392, filed May 1, 1946. These links are so designed that ample clearance is available between the adjacent surfaces thereof when slack so as to afford the necessary sand room in the casting operation. More particularly, each conventional link 4 has two side bars 7 connected by the curved ends 6, and preferably reinforced by an intermediate transverse tie bar or strut 8 bisecting the open area circumscribed by the loop. As a result, two openings 9 are defined in the opposite ends of each link 4 for the reception of the curved ends 6 of the contiguous links.

The connecting link 1 preferably is so constructed that when fully assembled it will conform closely in shape and size to, and simulate the strength and rigidity of, the conventional links 4. Thus, the half links 2 and 3 are provided with curved ends 10 which are adapted to be inserted through the openings 9 of the adjacent links 4 to be joined together, and which are similar in shape to the curved ends 6 of the latter. As disclosed in said copending application, the inner bearing surfaces of the curved ends 6, and likewise the curved ends 10 of the half links 2 and 3 herein, are curved in the general plane of the link symmetrically along a central arc struck on a relatively short radius R and extending through approximately 90°, and then along contiguous arcs struck on equal radii R', longer than the radius R and extending through approximately 45° from each side of the central arc. In all radial planes perpendicular to the general plane of the link, the end bearing surfaces are convex and arcuate with radii equal to the radius R of the central arc. Also, the locking means 5 for the half links 2 and 3 when assembled therewith simulates the strut 8. Since the connecting link 1 is separable from, and produced independently of, the chain, its elements may be made in any suitable manner as, for example, by casting or forging.

The half links 2 and 3 are formed respectively with spaced parallel side arms or extensions 11 and 12 integral with the opposite legs of the curved ends 10. These side arms 11 and 12 are of such form that they will slidably interfit in overlapping relation, and are of reduced width in the face of the link so that when disposed in interfitting relationship, they will provide connections corresponding in function to the side bars 7 of the conventional integral links 4. Preferably, however, the half links 2 and 3 are not exactly alike in construction, the side arms 11 of the link section 2 being symmetrically offset outwardly in relation to the inner end bearing surface, and the side arms 12 of the link section 3 being symmetrically offset inwardly in relation to the outer end surface so as to extend between and interfit with the arms 11. The curved ends 10, however, are alike in construction, and coact with the locking means 5 to define end openings 13 adapted for insertion of the curved ends 6 of the links 4.

The locking means 5 coacts with the overlapping side arms or extensions 11 and 12 to secure the half links 2 and 3 together in link shape. In the present instance, the locking means 5 comprises two pins 14 and 15 which are adapted to be inserted in side bearing engagement through registering openings 16 and 17 of complemental cross sectional shape in the interfitting side arms 11 and 12 of the half links 2 and 3. Thus, the pins 14 and 15 when assembled constitute in effect a longitudinally split strut. To provide the necessary stock for the formation of the openings 16 and 17 without impairment of the strength necessary to withstand the normal chain tension, the side arms 11 and 12 are increased in width transversely of the pins 14 and 15, but otherwise the curved ends 10 are flat-sided and substantially the same in width between opposite side faces as the links 4.

The locking pins 14 and 15 may be provided in any desired shape, and, in the present instance, are rectangular in transverse section and substantially the same in size. The registering openings 16 and 17 in the arms 11 and 12, of course, correspond in size and shape to the assembled pins 14 and 15 as a unit. Preferably, the remote side surfaces of the pins 14 and 15 are parallel but the adjacent or contacting surfaces 18 are slightly inclined so that the pins in effect are wedge members. As a result, the pins 14 and 15 may be driven endwise into locking engagement with the sides of the openings 16 and 17.

It will be evident that the pins 14 and 15 must withstand the shearing action exerted thereon by the side arms 11 and 12 when the chain is subjected to a pull. Within the broad aspects of the invention, the pins 14 and 15 may be split longitudinally in any desired plane, for example, either in the general plane of the link or in a plane perpendicular thereto. In the form of Figs. 1 to 5, the pins 14 and 15 are disposed side by side in the general plane of the link, which arrangement has the advantage that the locking means can be made correspondingly wide to provide the required strength without reducing the cross-sectional area of the overlapping side arms 11 and 12. In other words, a larger and stronger shear area is obtainable without unduly reducing the strength of the side arms 11 and 12.

The pins 14 and 15 are so constructed that they will interlock with the arms 11 and 12 to prevent the link from collapsing or expanding, and to prevent displacement of the pins as a unit from the openings 16 and 17. In the present instance, the pin 15 is flat-sided, but the pin 14 is formed on the outer side with a rectangular lug 19 facing the half link 2. The lug 19 is substantially equal in length to the distance between the arms 12, and when in position extends between the ends of the arms to prevent collapse of the link when subjected to a heavy pull. The outer ends of the pin 14 preferably are formed with lugs 20 which are adapted to engage in notches 21 in the outer surfaces of the arms 11 to constrain the link against lateral expansion. In assembling the locking means, the pin 14 is first inserted through the openings 16 and 17 of the half links 2 and 3, and then shifted laterally therein to position the lugs 19 and 20 in interlocking engagement with the arms 11 and 12. Then the pin 15 is inserted to complete the pin assembly and to maintain the pin 14 in position.

The pins 14 and 15 are formed in their adjacent contacting surfaces 18 with opposed complemental recesses 22 which will be in registry when the pin 15 is fully inserted and which define a hole or keyway for the reception of a key 23 to lock the pins 14 and 15 against relative longitudinal movement. The hole 22 and key 23 may be of any desired shape, and, in the present instance, the key is shown as a round bolt or rod which, after insertion, may be bent at the ends to prevent displacement. It will be evident that when the pins 14 and 15 have been extended through the openings 16 and 17, and the key 23 has been inserted, the lugs 19 and 20 will prevent removal of the pins as a unit.

The modified form of connecting link 1a, shown in Figs. 6 to 9, inclusive, is generally similar to the connecting link 1, and hence corresponding parts are identified by the same reference numerals plus the letter "a." In this form of link, the arms 11a are provided with transverse notches 24 adapted to receive transverse lugs 25 on the arms 12a. Consequently, the half links 2a and 3a are assembled by a lateral sliding movement to bring the notches 24 and lugs 25 into interfitting engagement. The enlarged outermost ends of the arms 11a coact with the lugs 25 to constrain the half links 2a and 3a against longitudinal separation. In this instance, the pins 14a and 15a are shown as split in the general plane of the link. The pin 14a has a central lug 19a interfitting with the arms 12a for preventing collapse of the link, and outer end lugs 20a fitting into recesses 21a in the arms 11a to prevent expansion of the link, and the pin 15a is relatively thin and not wedge-shaped. Any suitable key, such as screw 23a may be utilized to connect the pins 14a and 15a when they are inserted into position.

It will be evident that we have provided a new and improved connecting link which may be readily assembled and disassembled, and which is simple and inexpensive in construction. The link is similar in size and shape, and comparable in strength, to the conventional chain links which it is designed to connect.

We claim as our invention:

1. A connecting chain link comprising, in combination, two curved end sections having symmetrical spaced parallel side arms, said arms having rectangular openings extending laterally therethrough, the arms of one section being adapted to extend between and interfit with the arms of the other section and with said openings in registration transversely of said link, two rectangular wedge pins adapted to be inserted in side contacting relation and with a complemental fit through said openings to connect said sections, said pins when in position defining a longitudinally split strut extending through the interior space of the link, one of said pins having means adapted for interlocking engagement with at least one of said sections to constrain said one pin against longitudinal movement, and means for interlocking said pins to prevent relative longitudinal movement thereof.

2. A connecting chain link comprising, in combination, two curved end sections having symmetrical spaced parallel side arms, said arms having rectangular openings extending laterally therethrough, the arms of one section being adapted to extend between and interfit with the arms of the other section and with said openings in registration transversely of said link, two rectangular pins adapted to be inserted in side contacting relation, and with a complemental fit through said openings to connect said sections, said pins when in position defining a strut extending across the interior space of the link and longitudinally split in a plane perpendicular to the plane of the link, one of said pins having a lug adapted for interlocking engagement with the innermost set of said arms to constrain said one pin against longitudinal movement and to prevent lateral contraction of said arms, and means for interlocking said pins to prevent relative longitudinal movement thereof.

3. A connecting chain link comprising, in combination, two curved end sections having symmetrical spaced parallel side arms, said arms having rectangular openings extending laterally therethrough, the arms of one section being adapted to extend between and interfit with the arms of the other section and with said openings in registration transversely of said link, two rectangular pins adapted to be inserted in side contacting relation, and with a complemental fit through said openings to connect said sections, said pins when in position defining a strut extending across the interior space of the link and longitudinally split in a plane perpendicular to the plane of the link, one of said pins having an intermediate side lug and outer side lugs movable therewith laterally in said openings to position said intermediate lug between the innermost arms and said outer lugs in interfitting engagement with the outermost arms, the other of said pins being separately insertable into said openings to block said one pin in position, and a key for interconnecting said pins to prevent relative longitudinal movement thereof.

4. A connecting chain link comprising, in combination, two curved end sections having spaced parallel side arms, said arms having openings extending laterally therethrough, and being adapted for overlapping engagement with said openings in registration transversely of said link, two pins adapted to be inserted in side contacting relation and with a complemental fit through said openings to connect said sections, said pins when in position defining a longitudinally split strut extending through the interior space of the link, means on one of said pins for preventing lateral contraction of said link, and means for interlocking said pins to prevent relative longitudinal movement thereof.

5. A connecting chain link comprising, in combination, two U-shaped half links each having spaced parallel side arms, said arms of said half links having openings therein and being adapted to be assembled in overlapping engagement with said openings in registration transversely of the link, and locking means adapted to be removably inserted through said openings to connect said half links, said locking means comprising a transverse strut split longitudinally to define two slidable pin members independently insertable into said openings, lugs on one of said pin members movable laterally therewith in said openings into interlocking engagement with said arms, and means for connecting said pin members together when in said openings.

6. A connecting chain link comprising, in combination, two U-shaped half links each having spaced parallel side arms, said arms of said half links having openings therein and being adapted to be assembled in overlapping engagement with said openings in registration transversely of the link, said arms of said respective half links also being in longitudinal interlocking engagement to prevent direct longitudinal separation, and locking means adapted to be removably inserted through said openings to connect said half links, said locking means comprising a transverse strut extending across the interior space of the link and including means for preventing lateral contraction or expansion of the link.

7. A connecting chain link comprising, in combination, two curved end sections having spaced parallel side arms, said arms having openings extending laterally therethrough, the arms of one section being adapted to extend between and interfit with the arms of the other section and with said openings in registration transversely of said link, means for interlocking said arms against direct longitudinal separation, two rectangular pins adapted to be inserted in side contacting relation and with a complemental fit through said openings to connect said sections, said pins when in position defining a longitudinal strut extending across the interior space of the link and split in the medial plane of the link between the side faces of the link, one of said pins having means adapted for interlocking engagement with at least one of said sections to constrain said one pin against longitudinal movement, and means for interlocking said pins to prevent relative longitudinal movement thereof.

CARLOS E. ANDERSON.
CHARLES E. SENNHOLTZ.

REFERENCES CITED

The following references are of record in the file of this patent:

UNITED STATES PATENTS

| Number | Name | Date |
|---|---|---|
| 1,513,729 | Adams | Nov. 4, 1924 |
| 2,259,217 | Stevenson | Oct. 14, 1941 |

FOREIGN PATENTS

| Number | Country | Date |
|---|---|---|
| 17,599 | Great Britain | Dec. 3, 1888 |